US009152480B2

(12) United States Patent
Chen

(10) Patent No.: US 9,152,480 B2
(45) Date of Patent: Oct. 6, 2015

(54) METHOD FOR STORING APPLICATION DATA AND TERMINAL DEVICE

(71) Applicant: Huawei Device Co., Ltd., Shenzhen, Guangdong (CN)

(72) Inventor: Lei Chen, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/141,775

(22) Filed: Dec. 27, 2013

(65) Prior Publication Data

US 2014/0115609 A1 Apr. 24, 2014

Related U.S. Application Data

(63) Continuation of application No. PCT/CN2013/070143, filed on Jan. 7, 2013.

(30) Foreign Application Priority Data

Feb. 28, 2012 (CN) .......................... 2012 1 0047761

(51) Int. Cl.
G06F 9/54 (2006.01)
G06F 9/445 (2006.01)

(52) U.S. Cl.
CPC ........ G06F 9/544 (2013.01); G06F 8/60 (2013.01); G06F 9/44505 (2013.01)

(58) Field of Classification Search
None
See application file for complete search history.

(56) References Cited

U.S. PATENT DOCUMENTS

| 6,360,364 | B1* | 3/2002 | Chen et al. ..................... 711/169 |
| 8,024,712 | B1* | 9/2011 | Korolev et al. ................ 717/127 |
| 2002/0184451 | A1 | 12/2002 | Dovi |
| 2004/0172526 | A1 | 9/2004 | Tann et al. |
| 2005/0097394 | A1* | 5/2005 | Wang et al. ...................... 714/11 |
| 2006/0070085 | A1 | 3/2006 | Bao et al. |
| 2008/0005472 | A1 | 1/2008 | Khalidi et al. |
| 2011/0087874 | A1* | 4/2011 | Timashev et al. ............. 713/100 |
| 2011/0106841 | A1 | 5/2011 | Cao et al. |
| 2011/0128640 | A1* | 6/2011 | Koh ............................... 359/823 |
| 2012/0075355 | A1* | 3/2012 | Ogita et al. .................... 345/690 |

FOREIGN PATENT DOCUMENTS

CN 101340663 A 1/2009
CN 101404023 A 4/2009

(Continued)

OTHER PUBLICATIONS

"How to Modify the Path to Save Data," Huawei (Mar. 2001).

*Primary Examiner* — Tuan Dao
(74) *Attorney, Agent, or Firm* — Leydig, Voit & Mayer, Ltd.

(57) ABSTRACT

Embodiments of the present disclosure provide a method for storing application data and a terminal device, and relate to the field of communications, so that installation of an application having a default specified path and storage of data that is generated after the application is run are enabled to be located in the same storage space. The method includes: receiving an instruction for running a local application, wherein the instruction is triggered by a user; determining an actual path of a storage space in which the application is installed; running the application, and acquiring data that is generated after the application is run; and storing the data that is generated after the application is run in the actual path of the storage space in which the application is installed. The embodiments of the present disclosure are applied to use of a mobile phone.

10 Claims, 3 Drawing Sheets

(56) References Cited

FOREIGN PATENT DOCUMENTS

| | | |
|---|---|---|
| CN | 101425016 A | 5/2009 |
| CN | 101853296 A | 10/2010 |
| CN | 102053903 A | 5/2011 |
| CN | 102646042 A | 8/2012 |
| JP | 2009543200 A | 12/2009 |
| JP | 2012027733 A | 2/2012 |

* cited by examiner

METHOD FOR STORING APPLICATION DATA AND TERMINAL DEVICE

CROSS-REFERENCE TO RELATED APPLICATIONS

This application is a continuation of International Patent Application No. PCT/CN2013/070143, filed on Jan. 7, 2013, which claims priority to Chinese Patent Application No. 201210047761.3, filed on Feb. 28, 2012, both of which are hereby incorporated by reference in their entireties.

TECHNICAL FIELD

The present disclosure relates to the field of communications, and in particular, to methods for storing application data and a terminal device.

BACKGROUND

In the prior art, a storage space of a mobile phone may be classified into a self-owned storage space and an extended storage space according to a location of the storage space, for example, a built-in SD card (a separate storage space provided on a self-owned storage chip) as the self-owned storage space and an external SD card as the extended storage space. A mobile phone typically has two such SD cards.

Currently, for installation of an application and storage of running data on an open platform such as android (android), only a specified path is used by default, for example, only a path "/sdcard" is identified. Some manufacturers, before a mobile phone leaves the factory, directly map a built-in SD card to a specified path "/sdcard"; some manufactures directly map an external SD card to a specified path "/sdcard"; and some manufactures switch mapping paths of a built-in SD card and an external SD card when the external SD card is inserted in or pulled out.

Different path mapping modes for a built-in SD card and an external SD card in the industry bring much inconvenience for a user. For example, when a built-in SD card of a certain mobile phone is fixedly mapped to a specified path "/sdcard", if a user installs an application in an external SD card, data that is generated after the application is run is still stored in the built-in SD card; on the contrary, when an external SD card of a certain mobile phone is fixed mapped to a specified path "/sdcard", if a user installs an application in a built-in SD card, data that is generated after the application is run is still stored in the external SD card.

SUMMARY

Embodiments of the present disclosure provide a method for storing application data and a terminal device, so that installation of an application having a default specified path and storage of data that is generated after the application is run are enabled to be located in the same storage space.

In order to achieve the foregoing objective, the embodiments of the present disclosure adopt the following technical solutions:

In one aspect, a method for storing application data is provided, which includes:
receiving an instruction for running an application, where the instruction is triggered by a user;
determining an actual path of a storage space in which the application is installed;
running the application, and acquiring data that is generated after the application is run; and
storing the data that is generated after the application is run in the actual path of the storage space in which the application is installed.

In another aspect, a terminal device is provided, which includes:
a receiving unit, configured to receive an instruction for running an application, where the instruction triggered by a user;
a determining unit, configured to determine an actual path of a storage space in which the application is installed;
a running unit, configured to run the application, and acquire data that is generated after the application is run; and
a storage unit, configured to store the data that is generated after the application is run in the actual path of the storage space in which the application is installed.

With the method for storing application data and the terminal device provided in the embodiments of the present disclosure, an instruction for running a local application is received, where the instruction is triggered by a user; an actual path of a storage space in which the application is installed is determined; the application is run, and data that is generated after the application is run is acquired; and the data that is generated after the application is run is stored in the actual path of the storage space in which the application is installed. In this way, by determining the actual path of the storage space in which the application is installed, the data that is generated after the application is run is stored in the storage space in which the application is installed, so that installation of an application having a default specified path and storage of data that is generated after the application is run are enabled to be located in the same storage space, thereby facilitating use for a user.

BRIEF DESCRIPTION OF DRAWINGS

To describe the technical solutions in the embodiments of the present disclosure more clearly, the accompanying drawings required for describing the embodiments are introduced briefly in the following. Apparently, the accompanying drawings in the following description show only some of the embodiments of the present disclosure, and persons of ordinary skill in the art may also obtain other drawings according to these accompanying drawings without creative efforts.

DESCRIPTION OF EMBODIMENTS

The technical solutions in the embodiments of the present disclosure are clearly described in the following with reference to the accompanying drawings in the embodiments of the present disclosure. Apparently, the embodiments to be described are only a part rather than all of the embodiments of the present disclosure. All other embodiments obtained by persons skilled in the art based on the embodiments of the present disclosure without creative efforts shall fall within the protection scope of the present disclosure.

Figure 1:
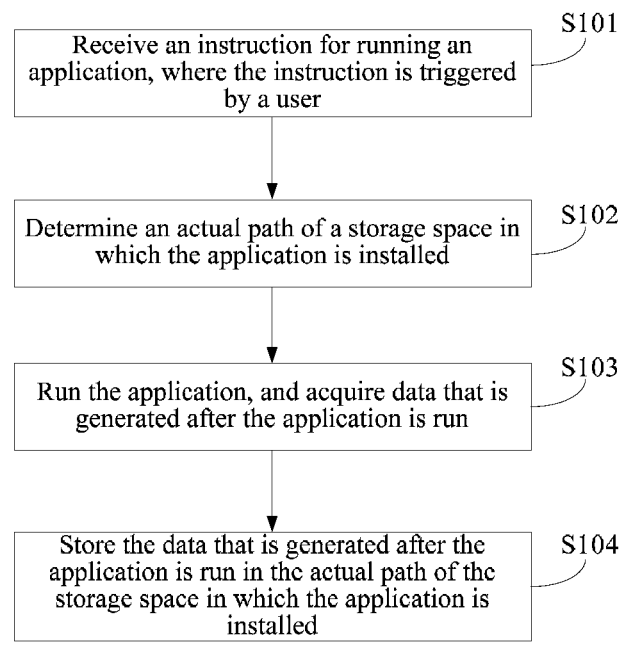
FIG. 1 is a flow chart of a method for storing application data according to an embodiment of the present disclosure.

An embodiment of the present disclosure provides a method for storing application data, as shown in FIG. 1, including:

S101: Receive an instruction for running an application, where the instruction is triggered by a user.

S102: Determine an actual path of a storage space in which the application is installed.

S103: Run the application, and acquire data that is generated after the application is run.

S104: Store the data that is generated after the application is run in the actual path of the storage space in which the application is installed.

In this way, by determining an actual path of a storage space in which an application is installed, data that is generated after the application is run is stored in the storage space in which the application is installed, so that installation of an application having a default specified path and storage of data that is generated after the application is run are enabled to be located in the same storage space, thereby facilitating use for a user.

Figure 2:
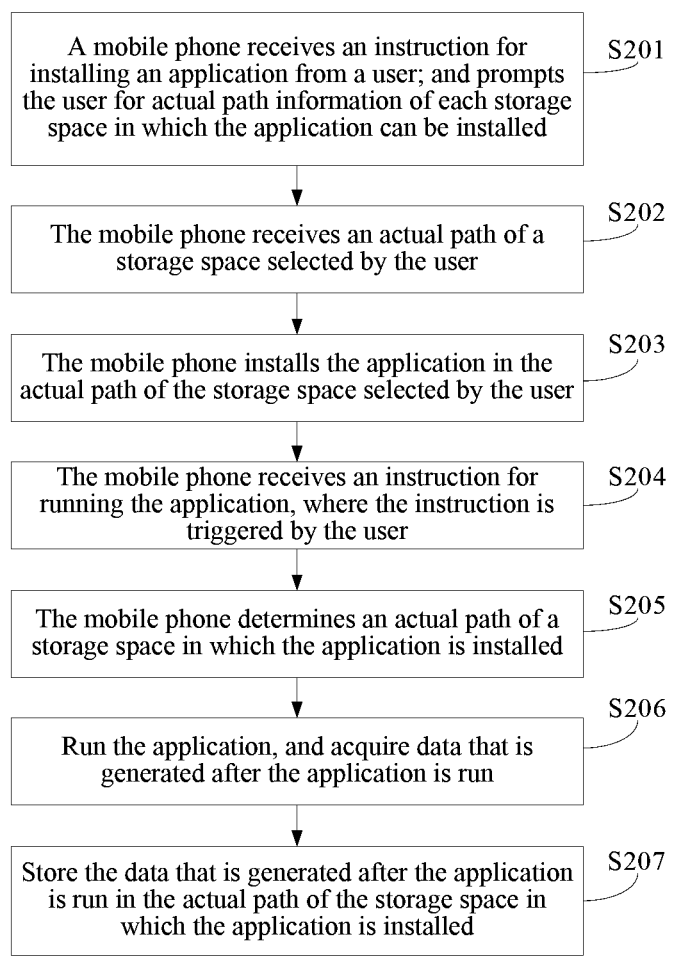
FIG. 2 is a flow chart of another method for storing application data according to an embodiment of the present disclosure.

Another embodiment of the present disclosure provides a method for storing application data, which is described by taking an android mobile phone serving as a terminal device as an example, and specific steps are as shown in FIG. 2.

In this embodiment, before a mobile phone leaves the factory, two storage spaces in which an application can be installed are provided, namely, a self-owned storage space (that is, a built-in SD card) and an extended storage space (an external SD card). In this embodiment, it is assumed that, before a mobile phone leaves the factory, an actual path of the built-in SD card is set to "/sdcard/inner", and an actual path of the external SD card is set to "/sdcard/outer". The actual paths of the foregoing storage spaces may be set randomly according to an actual situation, and are only exemplary herein.

S201: A mobile phone receives an instruction for installing an application from a user; and prompts the user for actual path information of each storage space in which the application can be installed.

In this embodiment, after the user downloads an application of an android open platform into the mobile phone, when the user installs the application, that is, after the mobile phone receives an instruction for installing the application from the user, the mobile phone prompts the user for actual path information of each storage space in which the application can be installed. In this embodiment, to facilitate check of the user, the mobile phone displays, to the user, a built-in SD card storage space and an external SD card storage space in which the application can be installed, and the user may select a storage space for installation according to an actual requirement in a self-directed manner, where actual paths of the built-in SD card storage space and the external SD card storage space are "/sdcard/inner" and "/sdcard/outer" respectively.

S202: The mobile phone receives an actual path of a storage space selected by the user.

In this embodiment, it is assumed that the user selects the external SD card as the storage space for installing the application, and an actual path of the storage space selected by the user is "/sdcard/outer", where the actual path is received by the mobile phone.

S203: The mobile phone installs the application in the actual path of the storage space selected by the user.

It should be noted that, for an application of a development platform, a default path is set in the application, and the default path is used to instruct the application to store data that is generated after the application is run in the default path. The default path is a well-known path. When an android application is run, in an android mobile phone, a path for transmission from a physical layer to an intermediate layer is set as the foregoing default path by default. In this embodiment, it is assumed that the default path of the android application is "/sdcard".

In this embodiment, if the user selects the external SD card for installing the application, the application is installed in a path "/sdcard/outer" of the external SD card. An intermediate layer of the mobile phone, when the application is installed, may record an application identification (Identification) of the application and an actual path of a storage space in which the application is installed, and stores, in a database of the mobile phone, a mapping between the application identification and the actual path of the storage space in which the application is installed. Each application identification corresponds to one application. When the application is loaded each time the mobile phone starts up, the intermediate layer may acquire information about the application ID and the actual path of the storage space.

S204: The mobile phone receives an instruction for running the application, where the instruction is triggered by the user.

In actual use, a terminal device generally divides a data processing process into three layers: The first layer is an application layer, that is, a client (which is also referred to as a user interface layer), which provides friendly access of the user to a system; the second layer is an intermediate layer (which is also referred to as an application service layer), which is used for implementing service logic; and the third layer is a drive layer (which is also referred to as a data source layer), which is responsible for storing, accessing, and optimizing data information, and therefore, data access after the application is run is performed in the drive layer. In the prior art, after the user triggers the application, the application layer transparently transmits a default path of the application to the drive layer through the intermediate layer, and the drive layer stores, according to the default path, data that is generated after the application is run. Therefore, data that is generated after an application of an android platform is run is stored in a default path by default. Generally, an existing application commonly uses a path "/sdcard" as a default path, that is to say, data that is generated after the application is run is stored in the path "/sdcard" by default.

S205: The mobile phone determines an actual path of a storage space in which the application is installed.

After the mobile phone receives the instruction for running the application, where the instruction is triggered by the user, the mobile phone acquires an application ID that indicates an identification of the application and is carried by the application; and then the mobile phone searches, according to the application ID, a database for an actual path of a storage space in which the application is installed, where the actual path of the storage space corresponds to the application identification, and a mapping between the application identification and the actual path of the storage space in which the application is installed is recorded and stored by the application layer in the database when the application is installed. The database may be a universal database used for data storage in the mobile phone, and may also be a database that is established separately and specified to store the mapping between the application identification and the actual path of the storage space in which the application is installed, which is not limited herein. For example, the mobile phone may scan, according to the application ID, the database to acquire the actual path of the storage space in which the application is installed, where the actual path of the storage space corresponds to the application identification, and may also acquire the mapping in a two-dimensional array query manner, and then obtain, according to the mapping, the actual path of the storage space in which the application is installed.

In this embodiment, the storage space in which the application is installed is an external SD card, and the actual path acquired through querying is a path "/sdcard/outer".

S206: Run the application, and acquire data that is generated after the application is run.

The running the application and acquiring the data that is generated after the application is run are executed in the drive layer of the mobile phone.

S207: Store the data that is generated after the application is run in the actual path of the storage space in which the application is installed.

In this embodiment, according to a rule in the industry, a default path predetermined by an application is "/sdcard", and after the intermediate layer of the mobile phone determines that the application is installed in an external SD card, the intermediate layer can acquire an actual path "/sdcard/outer" of the external SD card. When the application is run, the physical layer sends the default path "/sdcard" of the application to the intermediate layer; however, the intermediate layer in this embodiment of the present disclosure no longer sends the default path "/sdcard" to the drive layer as that in the prior art, but sends the acquired actual path "/sdcard/outer" to the drive layer, so that the drive layer stores data that is generated after the application is run in the actual path "/sdcard/outer".

Particularly, a sending relationship of the path may be set before the mobile phone leaves the factory. In addition, when the mobile phone receives the instruction for running the application, where the instruction is triggered by the user, after determining an installation position of the application, the intermediate layer may correspondingly send different actual paths to the drive layer according to different installation positions. Therefore, in the method for storing application data provided in this embodiment of the present disclosure, step S207 and a sequence of the foregoing steps are only exemplary, which is not limited herein in actual use. Any variation method that can be easily figured out by persons skilled in the art within the technical scope disclosed in the present disclosure shall all fall within the protection scope of the present disclosure.

In this embodiment, installing the application in the external SD card is taken as an example for description, and definitely, the user may also install the application in the built-in SD card. In this case, after the application is run, the intermediate layer sends an acquired actual path "/sdcard/inner" to the drive layer; and its process and effect are the same as those in this embodiment, which are not described herein again.

In this way, when the storage space in which the application is installed is a self-owned storage space of the mobile phone, a data file that is generated after the application is run is also stored in the self-owned storage space of the mobile phone finally; and when the storage space in which the application is installed is an extended storage space of the mobile phone, a data file that is generated after the application is run is also stored in the extended storage space of the mobile phone finally. In the two cases, installation of the application and storage of data that is generated after the application is run are enabled to be located in the same storage space, which is convenient for the user of the mobile phone to use. In actual use, when the extended storage space is an external SD card, if the storage space in which the application is installed is the self-owned storage space of the mobile phone, the installation and running of the application are both irrelevant to the external SD card, and insertion and pulling of the external SD card do not affect the installation and running of the application. When the storage space in which the application is installed is the extended storage space of the mobile phone, if the external SD card is in place, the application is stored in the external SD card; and if the external SD card is pulled out, that is, if the external SD card is out of place, the application and data that is stored after the application is run are not lost, where the application and the data that is stored after the application is run are stored in the external SD card, and when the external SD card is inserted in again, the path setting still exists, so that re-running of the application and storage of a data file that is generated after the running are not affected.

Further, a root directory of an actual path of each storage space in the mobile phone may be the same as a root directory of a default path, for example, the root directory of the actual path of the storage space may be set to "/sdcard". In this way, it may be ensured that some media applications, such as MUSIC (music) and PICTURE (picture), which automatically scan files in all directories in the directory "/sdcard" by default in the prior art, can be run normally.

With the method for storing application data provided in this embodiment of the present disclosure, by determining an actual path of a storage space in which an application is installed, data that is generated after the application is run is enabled to be directly stored in the storage space in which the application is installed, so that installation of an application having a default specified path and storage of data that is generated after the application is run are enabled to be located in the same storage space, thereby facilitating use for a user.

Particularly, for a case that in the prior art, some mobile phones switch mapping paths of a built-in SD card and an external SD card when the external SD card is inserted in or pulled out, when the external SD card is inserted in, the mapping path of the external SD card may be switched to a default path, that is, "/sdcard", and the mapping path of the built-in SD card may be switched to a non-default path having the same root directory as that of the default path, for example, "/sdcard/inner". In this way, it may be ensured that some media applications, such as MUSIC (music) and PICTURE (picture), which automatically scan files in all directories in the directory "/sdcard" by default in the prior art, can be run normally.

Figure 3:
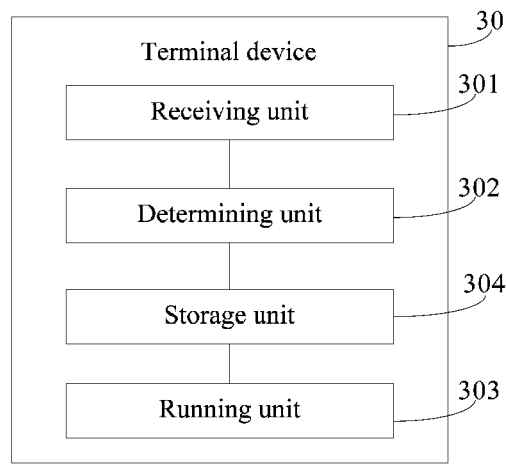
FIG. 3 is a schematic structural diagram of a terminal device according to an embodiment of the present disclosure.

An embodiment of the present disclosure provides a terminal device 30, as shown in FIG. 3, including:

A receiving unit 301 is configured to receive an instruction for running a local application, where the instruction is triggered by a user.

A default path is set in the application, and the default path is used to instruct the application to store data that is generated after the application is run in the default path.

A determining unit 302 is configured to determine an actual path of a storage space in which the application is installed.

The determining unit 302 includes: an identification acquiring module, configured to acquire an application identification that indicates an identification of the application and is carried in the application; and a path determining module, configured to search, according to the application identification, a database for an actual path of a storage space in which the application is installed, where the actual path of the storage space corresponds to the application identification.

A mapping between the application identification and the actual path of the storage space in which the application is installed is recorded and stored by an application layer in the database when the application is installed.

A running unit 303 is configured to run the application, and acquire data that is generated after the application is run.

A storage unit 304 is configured to store the data that is generated after the application is run in the actual path of the storage space in which the application is installed.

In this way, the running unit runs the application after the receiving unit receives the instruction for running the local application, where the instruction is triggered by the user, and the storage unit stores, according to the actual path of the storage space in which the application is installed, the data that is generated after the application is run in the actual path of the storage space, where the actual path is determined by the determining unit, so that the data that is generated after the application is run is stored in the storage space in which the application is installed, and therefore, installation of an application having a default specified path and storage of data that is generated after the application is run are enabled to be located in the same storage space, thereby facilitating use for a user.

Figure 4:
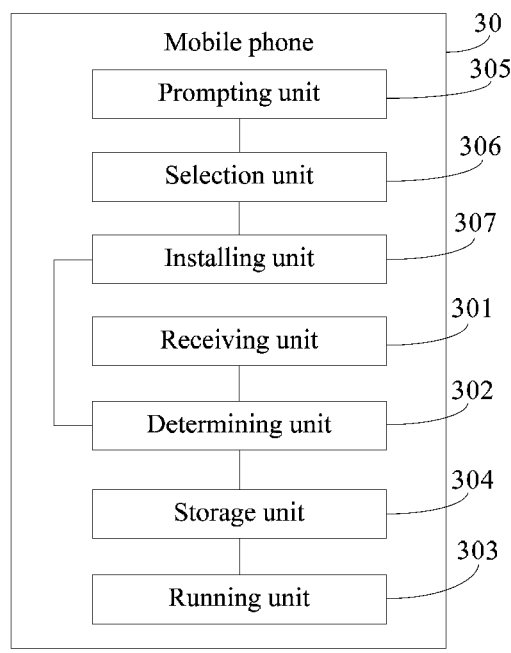
FIG. 4 is a schematic structural diagram of another terminal device according to an embodiment of the present disclosure.

Further, as shown in FIG. 4, the terminal device 30 further includes:

a prompting unit 305, configured to, after receiving an instruction that the user determines to install the application, prompt the user for an actual path of each storage space in which the application can be installed;

a selection unit 306, configured to receive an actual path of a storage space selected by the user; and an installing unit 307, configured to install the application in the actual path of the storage space selected by the user, and store, in the database, the mapping between the application identification, which indicates the identification of the application and is carried by the application, and the actual path of the storage space in which the application is installed.

It should be noted that, a root directory of an actual path of each storage space of the terminal device is the same as a root directory of a default path. The root directory of the actual path of the storage space may be a "/sdcard/" directory.

The terminal device includes a mobile phone, a human-machine interaction terminal, an e-book, and any one of terminals having a display function.

When the terminal device is a mobile phone, the mobile phone further includes a radio frequency circuit, an audio circuit, and a power supply circuit.

The radio frequency circuit is used to establish communication between the mobile phone and a wireless network, and implement data receiving and sending between the mobile phone and the wireless network.

The audio circuit is used to collect sound and convert the collected sound into sound data, so that the mobile phone sends the sound data to the wireless network through the radio frequency circuit; and/or restore sound data that is received by the mobile phone from the wireless network through the radio frequency circuit to sound and playback the sound to a user.

The power supply circuit is used to supply power to every circuit or component of the mobile phone.

The mobile phone may further include: a display screen, a power supply, and the like, so as to implement a basic function of the mobile phone. Particularly, the audio circuit includes a microphone and a loudspeaker, where the microphone is used to collect sound and convert the collected sound into sound data, so that the mobile phone sends the sound data to the wireless network through the radio frequency circuit; and the loudspeaker is used to restore sound data that is received by the mobile phone from the wireless network through the radio frequency circuit to sound and playback the sound to a user.

A power supply is mainly used to supply power to every circuit or component of the mobile phone, so as to ensure normal working of the mobile phone.

In the terminal device provided in this embodiment of the present disclosure, the running unit runs the application after the receiving unit receives the instruction for running the local application, where the instruction is triggered by the user, and the storage unit stores, according to the actual path of the storage space in which the application is installed, the data that is generated after the application is run in the actual path of the storage space, where the actual path is determined by the determining unit, so that the data that is generated after the application is run is stored in the storage space in which the application is installed, and therefore, installation of an application having a default specified path and storage of data that is generated after the application is run are enabled to be located in the same storage space, thereby facilitating use for a user.

The foregoing descriptions are only specific embodiments of the present disclosure, but are not intended to limit the present disclosure. Any variation or modification that can be easily figured out by persons skilled in the art within the technical scope disclosed in the present disclosure shall all fall within the protection scope of the present disclosure. Therefore, the protection scope of the present disclosure shall be subject to that of the claims.

What is claimed is:

1. A method performed by a terminal device for storing application data, wherein the terminal device has a first physical storage device and a second physical storage device, comprising:

receiving an instruction from a user to an application;

determining that the application is installed in the first physical storage device and that the application has a setting parameter indicating that data generated by the application is to be stored in the second physical storage device;

running the application, and acquiring data by running the application; and storing the data generated by running the application in the first physical storage device instead of the second physical storage device.

2. The method according to claim 1, wherein the determining that the application is installed in the first physical storage device comprises:

acquiring an application identification of the application;

searching, according to the application identification, a database containing information indicating a mapping of the application identification to the first physical storage device.

3. The method according to claim 1, wherein before receiving the instruction from the user to run the application the method further comprises:

installing the application in the first physical storage device in response to a user instruction; and storing, in a database, information indicating a mapping of an application identification of the application to the first physical storage device.

4. The method according to claim 1, wherein:

a root directory of the first physical storage device is set as same as a root directory of the second physical storage device.

5. The method according to claim 4, wherein, the root directory is "/sdcard".

6. A terminal device, comprising:

a first physical storage device and a second physical storage device;

computer-executable program code stored in the first physical storage device or the second physical storage device;

a processor executing the computer-executable program code to perform operations comprising:

receiving an instruction from a user to run an application;

determining that the application is installed in the first physical storage device and that the application has a setting parameter indicating that data generated by the application is to be stored in the second physical storage device;

running the application;

acquiring data generated by running the application; and storing the data generated by running the application in the first physical storage device instead of the second physical storage device.

7. The terminal device of claim 6, wherein the operation of determining that the application is installed in the first physical storage device comprises:

acquiring an application identification of the application;

searching, according to the application identification, a database containing information indicating a mapping of the application identification to the first physical storage device.

8. The terminal device according to claim 6, wherein before the operation of receiving the instruction from the user to run the application, the processor performs the operations of:

installing the application in the first physical storage device in response to a user instruction; and storing, in a database, information indicating a mapping of an application identification of the application to the first physical storage device.

9. The terminal device according to claim 6, wherein:

a root directory of the first physical storage device is set as same as a root directory of the second physical storage device.

10. The terminal device according to claim 9, wherein, the root directory is "/sdcard."

* * * * *

UNITED STATES PATENT AND TRADEMARK OFFICE
CERTIFICATE OF CORRECTION

PATENT NO. : 9,152,480 B2  
APPLICATION NO. : 14/141775  
DATED : October 6, 2015  
INVENTOR(S) : Lei Chen Page 1 of 1

It is certified that error appears in the above-identified patent and that said Letters Patent is hereby corrected as shown below:

In the claims

Column 8, Line 32, "to an" should read -- to run an --.

Column 8, Line 52, "application the" should read -- application, the --.

Signed and Sealed this
Seventh Day of June, 2016

Michelle K. Lee
*Director of the United States Patent and Trademark Office*